(12) United States Patent
Lefebvre (10) Patent No.: US 12,467,387 B1
(45) Date of Patent: Nov. 11, 2025

(54) TURBINE EXHAUST CASE STRUCTURAL FLANGE

(71) Applicant: PRATT & WHITNEY CANADA CORP., Longueuil (CA)

(72) Inventor: Guy Lefebvre, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/818,696

(22) Filed: Aug. 29, 2024

(51) Int. Cl.
| | |
|---|---|
| F01D 25/24 | (2006.01) |
| F01D 9/00 | (2006.01) |
| F01D 9/02 | (2006.01) |
| F01D 9/04 | (2006.01) |

(52) U.S. Cl.
CPC ............. *F01D 25/243* (2013.01); *F01D 9/00* (2013.01); *F01D 9/02* (2013.01); *F01D 9/04* (2013.01); *F01D 25/24* (2013.01); *F05D 2220/32* (2013.01)

(58) Field of Classification Search
CPC .......... F01D 25/243; F01D 25/24; F01D 9/00; F01D 9/02; F01D 9/04; F05D 2220/32
See application file for complete search history.

(56) References Cited

U.S. PATENT DOCUMENTS

| | | |
|---|---|---|
| 7,802,962 B2 | 9/2010 | Sjoeqvist |
| 8,408,011 B2 | 4/2013 | Fontaine et al. |
| 8,827,638 B2 | 9/2014 | Delitz |
| 9,243,514 B2 | 1/2016 | Krotzer, Jr. et al. |
| 9,759,356 B2 | 9/2017 | Ott et al. |
| 9,822,652 B2 | 11/2017 | Sjoqvist et al. |
| 10,100,676 B2 | 10/2018 | Farah et al. |
| 10,240,485 B2 | 3/2019 | Grussmann |
| 10,280,790 B2 | 5/2019 | Mountz et al. |
| 10,533,437 B2 | 1/2020 | Dale et al. |
| 10,815,832 B2 | 10/2020 | Staffier et al. |

(Continued)

FOREIGN PATENT DOCUMENTS

| | | |
|---|---|---|
| KR | 20210103853 A | 8/2021 |
| KR | 20210106800 A | 8/2021 |

OTHER PUBLICATIONS

"Haynes 282", Haynes International, "https://haynesintl.com/en/alloys/alloy-portfolio/high-temperature-alloys/haynes-282/#tensile-properties".*

(Continued)

*Primary Examiner* — Nathaniel E Wiehe
*Assistant Examiner* — Theodore C Ribadeneyra
(74) *Attorney, Agent, or Firm* — NORTON ROSE FULBRIGHT CANADA LLP (57) ABSTRACT

A turbine exhaust case has an inner ring structurally connected to an outer ring via a plurality of struts. An outer flange projects outwardly from the outer case. The outer flange is made of a material different from that of the outer case and includes a ring portion having an inner diameter surface joined to an outer diameter surface of the outer case at a first axial location corresponding to a junction of a leading edge of the plurality of struts and the outer case. The outer flange further includes a tubular portion projecting axially from the ring portion to a second axial location disposed upstream of the struts, and an annular mounting portion projecting outwardly from an outer surface of the tubular portion at the second axial location.

19 Claims, 4 Drawing Sheets

(56) References Cited

U.S. PATENT DOCUMENTS

| | | | |
|---|---|---|---|
| 10,907,508 B2 | 2/2021 | Knight et al. | |
| 11,002,152 B2 | 5/2021 | Smedresman et al. | |
| 11,156,123 B2 | 10/2021 | Sakamoto et al. | |
| 11,319,879 B2 | 5/2022 | Iwai et al. | |
| 11,319,897 B2 | 5/2022 | Joo et al. | |
| 11,473,449 B2 | 10/2022 | Lefebvre | |
| 11,506,385 B2 | 11/2022 | Onishi et al. | |
| 11,629,615 B2 | 4/2023 | Lefebvre | |
| 11,629,616 B1 | 4/2023 | Loucks et al. | |
| 11,739,663 B2 | 8/2023 | Kerns et al. | |
| 2008/0206047 A1* | 8/2008 | Dakowski | F01D 25/246 415/182.1 |
| 2016/0333740 A1* | 11/2016 | Sluyter | F01D 9/04 |
| 2022/0381156 A1* | 12/2022 | Lefebvre | F01D 25/26 |

OTHER PUBLICATIONS

"Special Metals INCONEL Alloy 718", Special Metals, "https://asm.matweb.com/search/specificmaterial.asp?bassnum=ninc34".*

* cited by examiner

TURBINE EXHAUST CASE STRUCTURAL FLANGE

TECHNICAL FIELD

The application relates generally to a turbine exhaust case (TEC) and, more particularly, to a TEC structural flange.

BACKGROUND OF THE ART

During operation of gas turbine engines, parts of the engine are exposed to the hot combustion gases. During transient events, such as when the gas turbine engine is started, the temperature of these parts may rapidly increase from a relative cold temperature to the hot temperature of the combustion gases.

The rapid increase in temperature of the parts exposed to the hot combustion gases may cause them to undergo thermal expansion. If these parts are mounted to other components, which do not experience such a rapid increase in temperature, a thermal mismatch may result and may lead to thermally-induced stresses.

SUMMARY

In one aspect, there is provided a turbine exhaust case for a gas turbine engine, comprising: an outer case extending around a central axis; an inner case concentrically disposed inside the outer case, the inner case and the outer case defining an annular gas path therebetween; a plurality of circumferentially spaced-apart struts extending across the annular gas path and structurally connecting the inner case to the outer case; and an outer structural flange projecting outwardly from the outer case, the outer structural flange made of a material different from that of the outer case, the outer structural flange including: a ring portion having an inner diameter surface joined to an outer diameter surface of the outer case at a first axial location corresponding to a junction of a leading edge of the plurality of circumferentially spaced-apart struts and the outer case; a tubular portion projecting axially from the ring portion to a second axial location disposed upstream of the plurality of circumferentially spaced-apart struts relative to an exhaust gas flow through the annular gas path; and an annular mounting portion projecting outwardly from an outer surface of the tubular portion at the second axial location.

In another aspect, there is provided a gas turbine engine comprising: a turbine including a turbine rotor rotatable about a central axis; a turbine support case (TSC) surrounding the turbine rotor; a turbine exhaust case (TEC) mounted to and extending downstream from the TSC relative to a flow of combustion gases through the turbine, the TEC including: an outer case extending around the central axis; an inner case concentrically disposed within the outer case; an annular exhaust gas path radially between the inner case and the outer case for discharging the combustion gases from the turbine; a plurality of struts extending across the annular exhaust gas path from the inner case to the outer case; and an outer structural flange extending radially outwardly from the outer case, the outer structural flange including: a ring portion having an inner diameter surface joined to an outer diameter surface of the outer case at a first axial location aligned with a junction of a leading edge of the plurality of struts and the outer case; a tubular portion projecting axially from the ring portion to a second axial location disposed upstream of the plurality of struts; and an annular mounting portion projecting radially outwardly from the tubular portion at the second axial location, the annular mounting portion secured to a corresponding flange of the TSC.

DESCRIPTION OF THE DRAWINGS

Reference is now made to the accompanying figures in which.

DETAILED DESCRIPTION

Figure 1A:
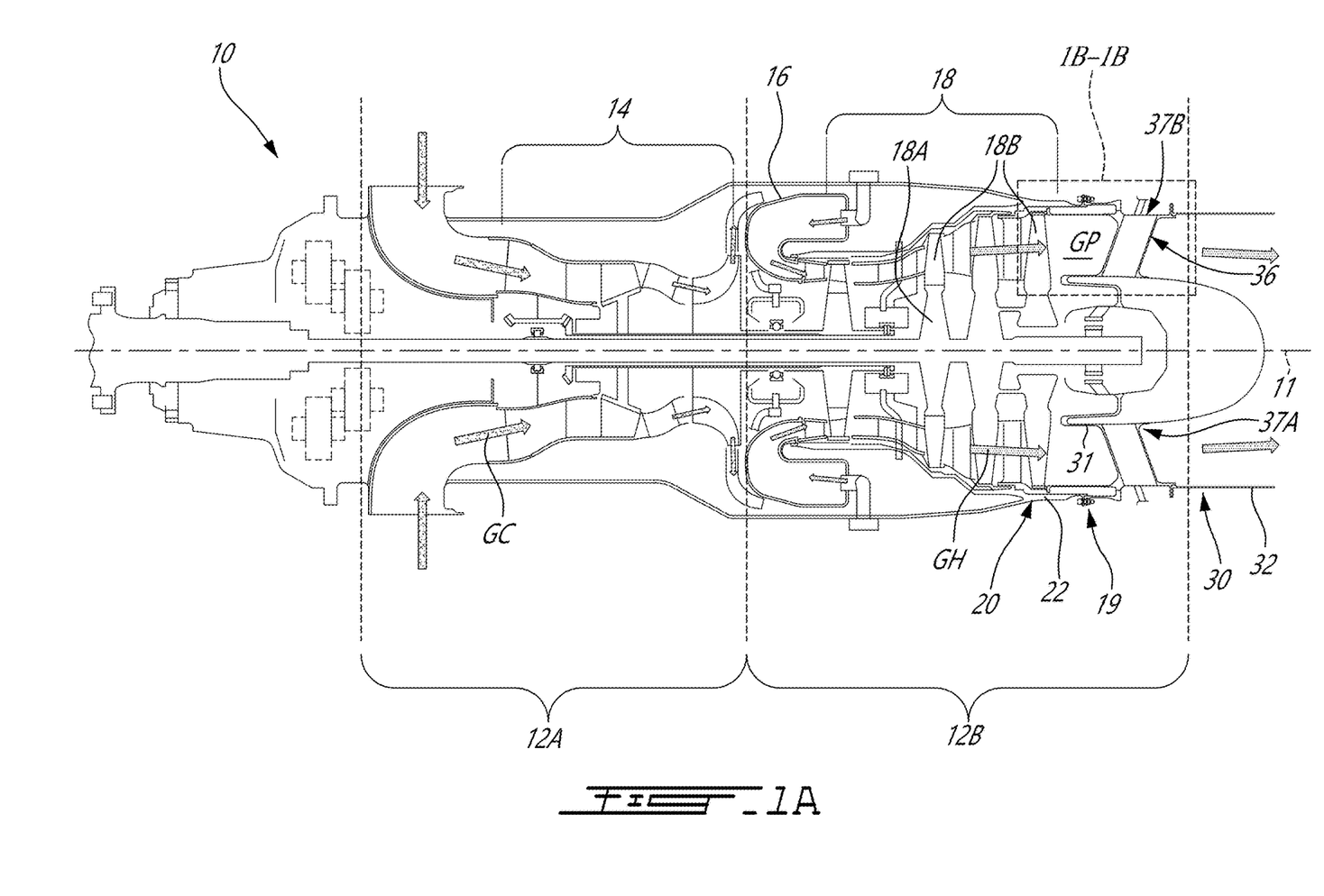
FIG. 1a is a schematic cross sectional view of a gas turbine engine.

FIG. 1A illustrates a gas turbine engine 10 of a type preferably provided for use in subsonic flight, generally comprising in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. Some of the rotatable components of the gas turbine engine 10 rotate about a longitudinal center axis 11 of the gas turbine engine 10.

The gas turbine engine 10 has a "cold" section 12A and a "hot" section 12B. The cold section 12A includes those components of the gas turbine engine 10 which are upstream (relative to the direction gases flow through the gas turbine engine 10) of the combustor 16 and have thus not been exposed to the hot combustion gases. The hot section 12B includes the combustor 16 and those components of the gas turbine engine 10 which are downstream of the combustor 16. The components of the hot section 12B are thus exposed to the hot combustion gases generated in the combustor 16. The gases GC flowing through the cold section 12A have a lower temperature than the gases GH flowing through the hot section 12B.

Referring to FIG. 1A, the hot section 12B includes the combustor 16, the turbine section 18 and a case downstream of the turbine section 18 for conveying the exhaust gases. The turbine section 18 includes one or more rotors 18A each having rotor blades 18B, which rotate about the center axis 11 and extract energy from the combustion gases. The rotors 18A and rotor blades 18B of the turbine section 18 are typically referred to as turbines and turbine blades, respectively. The hot section 12B includes stationary bodies which enclose other components of the hot section 12B and define the gas path GP for the hot combustion gases. These stationary bodies are sometimes referred to as casings or cases which collectively define radially-outer boundaries of the gas turbine engine 10.

Referring to FIG. 1A, the casing of the gas turbine engine 10 includes a turbine casing assembly 19 which is part of the hot section 12B. The turbine casing assembly 19 is a group of casing components that form part of the turbine section 18 and enclose the combustion gases. The turbine casing assembly 19 may be provided as disassembled cases which may then be assembled in a suitable facility. The turbine casing assembly 19 includes a first case 20 and a second case 30. In the embodiment of FIG. 1A, the first case 20 is a turbine support case (TSC) and is, thus, sometimes referred to herein as "turbine support case 20" or "TSC 20". In the embodiment of FIG. 1A, the second case 30 is a turbine exhaust case (TEC) 30 for conveying the hot exhaust gases, and is removably mounted to the TSC 20. It will be appreciated that the first and second cases 20,30 may be other cases of the hot section 12B. For example, in one possible alternate configuration, the first case 20 houses the combustor 16 and part of the components of the cold section 12A, and the second case 30 houses the rotors 18A and stators of the turbine section 18.

Still referring to FIG. 1A, the exemplified TSC 20 forms part of the casing for the gas turbine engine 10. The TSC 20 houses stationary and rotatable components of the turbine section 18, such as the rotor blades 18B, disks, or stator vanes of the turbine section 18, and defines part of the annular gas path GP for the hot combustion gases through the turbine section 18. The TSC 20 has a TSC body 22 which provides structure to the TSC 20 and forms the corpus thereof. In FIG. 1A, the TSC body 22 is cylindrical about the center axis 11. In FIG. 1A, the TSC body 22 defines part of the annular gas path GP for the hot combustion gases through the turbine section 18.

Figure 1B:
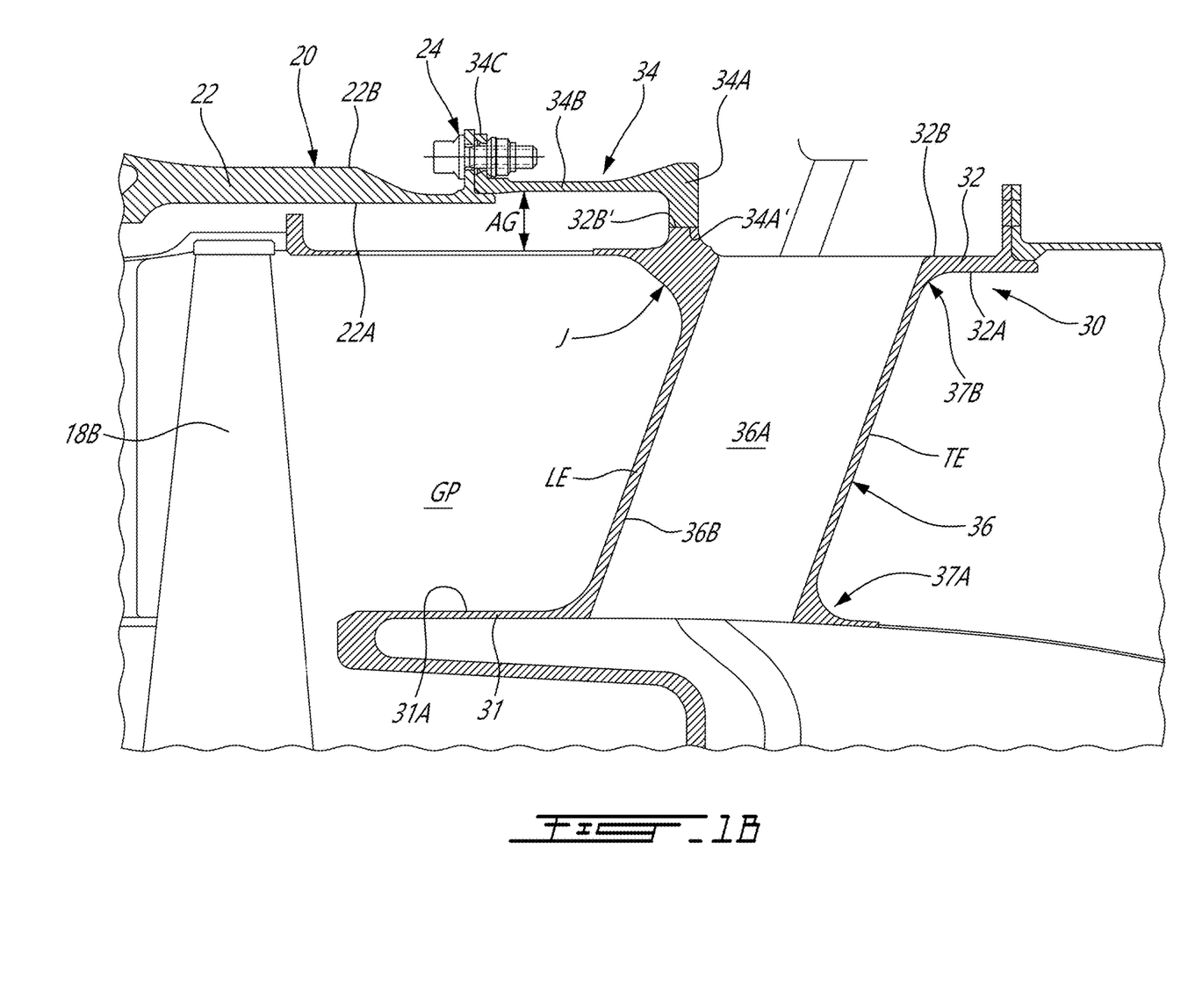
FIG. 1B is an enlarged cross-sectional view of region 1B-1B of FIG. 1A and illustrating details of a turbine exhaust case flange arrangement.

Referring to FIG. 1B, the TSC body 22 includes an inner wall surface 22A disposed radially inwardly (i.e. closer to the center axis 11) of an outer wall surface 22B. A radial thickness of the TSC body 22 is defined between the inner and outer wall surfaces 22A, 22B. The TSC body 22 has one or more TSC flanges 24. The TSC flange 24 is a radially-protruding annular body that is configured for mating with, and being secured to, a corresponding structure of the TEC 30 in order to assemble the TSC 20 and the TEC 30. In FIG. 1B, the TSC flange 24 extends radially outwardly from a radially-outermost surface at a downstream end of the TSC body 22 circumferentially continuously therearound. In FIG. 1B, the TSC flange 24 extends radially outwardly from the outer wall 22B of the TSC body 22.

Figure 2:
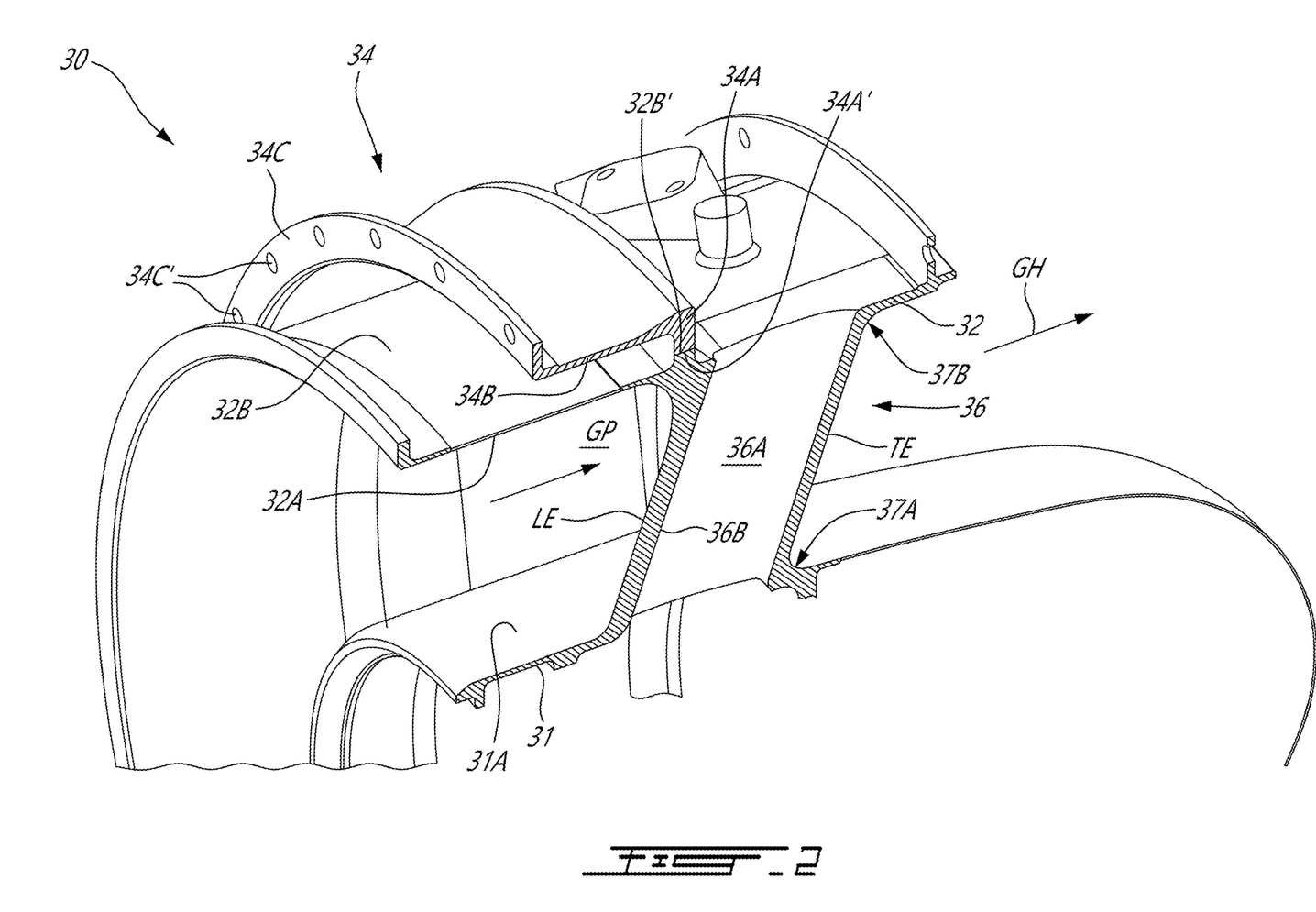
FIG. 2 is an enlarged 3D view, partly in cross-section, of the turbine exhaust case.

Referring jointly to FIGS. 1A and 1B, the TEC 30 forms part of the casing for the gas turbine engine 10. The TEC 30 is disposed downstream of the TSC 20 and is mounted thereto. The TEC 30 houses and supports components of the hot section 12B, such as the LP shaft bearings, and defines part of the annular gas path GP for discharging the combustion gases from the turbine section 18. As best shown in FIGS. 1B and 2, the TEC 30 generally comprises an outer case 32 provided in the form of an outer structural ring having a radially inner surface 32A forming a radially outer delimitation (i.e., outer gas path wall) of the annular gas path GP, an inner case 31 provided in the form of an inner structural ring having a radially outer surface 31A forming a radially inner delimitation (i.e., inner gas path wall) of the gas path GP, and a plurality of struts 36 extending generally radially across the gas path GP. The struts 36 are circumferentially interspaced from one another. Each strut 36 has an airfoil shape extending chordwise between a leading edge LE and a trailing edge TE. Each strut 36 extends spanwise from an inner end 37A to an outer end 37B disposed radially outwardly of the inner end 37A The struts 36 structurally connect the inner case 31 to the outer case 32. According to some embodiments, the inner and outer cases 31, 32 are concentrically mounted about the center axis 11. Still referring to FIGS. 1B and 2, each strut 36 may have a hollow body defining a hollow core, herein referred to as an internal cavity 36A. Oil service lines, coolant, probes and any other suitable objects may extend through the cavity 36A of the strut 36. The cavity 36A is delimited by an annular wall 36B. An axial thickness of the annular wall 36B of the strut 36 at the leading edge LE is defined along a line parallel to the center axis 11 between the inner and outer surfaces of the strut wall 36B. Likewise, an axial thickness of the of the annular wall 36B of the strut 36 at the trailing edge TL is defined along a line parallel to the center axis 11 between the inner and outer surfaces of the strut wall 36B. As can be appreciated from FIGS. 1B and 2, the axial thickness of the strut wall 36B can gradually increase towards the inner end 37A and the outer end 37B of the strut 36. According to the illustrated embodiment, the axial thickness of the outer end 37b of the strut wall 36B is significantly increased at a junction J of the leading edge LE of the strut 36 and the outer case 32. For instance, the strut wall thickness at the leading edge LE of the strut outer end 37B can be doubled or more relative to the strut wall thickness at a radial location midway between the inner and outer ends 37A and 37B of the strut leading edge LE. This contributes to better accommodate the effects of the thermal mismatch between the struts 36 and the surrounding components during the engine start up procedures.

Still referring to FIGS. 1B and 2, TEC 30 further comprises an outer structural flange 34 projecting outwardly from the outer case 32. The outer structural flange 34 is configured for mating with, and being secured to the TSC flange 24 in order to assemble the TSC 20 and the exhaust case 30.

When the gas turbine engine 10 undergoes a transient event, such as when the gas turbine engine 10 goes from being off to started up, the hot gases GH flowing through the TEC 30 heat up the struts 36 very quickly, particularly in compact engine designs. The struts 36 are heated more than the TSC 20 such that there is a thermal mismatch between the TEC 30 and the TSC 20. The heated struts 36 are caused to thermally expand radially outwardly more rapidly then the TSC 20 to which the outer case 32 is attached via the outer structural flange 34 of the TEC 30. Such a thermal mismatch between the struts 36 of the TEC 30 and the other components connected thereto may lead to thermally-induced stresses in the connection between the TEC 30 and the TSC 20. Stress concentrations in the connection between the TEC 30 and the TSC 20 may shorten the service life of the turbine case assembly 19. As will be seen hereinafter, the stress concentrations in the connection between the TEC 30 and the TSC 20 can be reduced and, thus, the durability of the exhaust case assembly improved by designing the flange connection so as to better accommodate the transient thermal growth differential between the struts 36 and the other casing components.

According to some embodiments, at least some of the above concerns can be alleviated by manufacturing the outer structural flange 34 as a separate component that is joined to the outer case 32 of the TEC 30. For instance, the outer case 32, the inner case 31 and the struts 36 could be manufactured as a unitary component made of a first material suitable for withstanding the temperatures of the exhaust gases flowing through the TEC 30 and the outer structural flange 34 could be separately manufactured from a second material different from the first material and selected, at least in part, for its tensile strength properties. According to some embodiments, the outer case 32, the inner case 31 and the struts 36 can be manufactured as a unitary/monolithic component made out of Waspaloy®, a nickel-base, age hardenable superalloy; and the outer structural flange 34 can be made out of Inconel® 625. Still; according to some embodiments, the inner case 31, the outer case 32 and the struts 36 can be cast all together from a superalloy of 58% nickel, 18-21% chromium, 12-15% cobalt, 3.5-8% molybdenum, 2.75-

3.25% titanium, 1.2-1.6% aluminum, and other metals; and the outer flange 34 could be made of a different nickel-chromium-based superalloy selected for its tensile strength.

The TEC 30 may have additional features that contribute to the functionalities described above. For example, referring to FIGS. 1b and 2, it can be seen that the outer structural flange 34 is provided in the form of a single continuous annular body including a sturdy/reinforced ring portion 34A having an inner diameter surface 34A' joined to an outer diameter raised surface 32B' of the outer case 32 at a first axial location corresponding to the junction J of the leading edge LE of the plurality of circumferentially spaced-apart struts 36 and the outer case 32. The ring portion 34A of the outer structural flange 34 may be welded to the outer case 32 at the interface between the inner diameter surface 34A' and the outer diameter surface 32B'. The weld line may be circumferentially continuous. Other joining techniques, such as brazing are contemplated. In fact, any manufacturing methods allowing for the integration of a different flange material could be used. For instance, 3D printing could be used to manufacture such a dual material TEC component.

The axial alignment of the ring portion 34A of the outer structural flange 34 with the reinforced junction J between the strut leading edge LE and the outer case 32 contributes to better accommodate the sudden thermal growth of the struts 36 at engine start-up. The additional material provided in this region contributes to better absorb the thermal stress.

Still referring to FIGS. 1b and 2, it can be appreciated that the unitary body of the outer structural flange 34 further comprises a tubular portion 34B projecting axially forwardly from the ring portion 34A to a second axial location disposed upstream of the plurality of circumferentially spaced-apart struts 36 relative to the flow of exhaust gases through the TEC 30, and an annular mounting portion 34C projecting radially outwardly from the tubular portion 34B at the second axial location. According to some embodiments, the tubular portion 34B is cylindrical about the center axis 11 and spaced from the outer baseline surface 32B of the outer case 32 by an annular gap AG. The annular gap AG may be sized to accommodate some flexions in the tubular portion 34B relative to the outer case 32. The annular mounting portion 34C projects radially outwardly from the distal end of the tubular portion 34B and extends around the entire circumferential periphery of the tubular portion 34B.

As shown in FIG. 2, the annular mounting portion 34C of the outer structural flange 34 has a circumferential array of holes 34C' configured to be aligned with corresponding holes in the TSC flange 24 (see FIG. 1B) and to receive therethrough bolts secured in the registering holes with nuts, thereby attaching the TEC 30 to the TSC 20.

Figure 3:
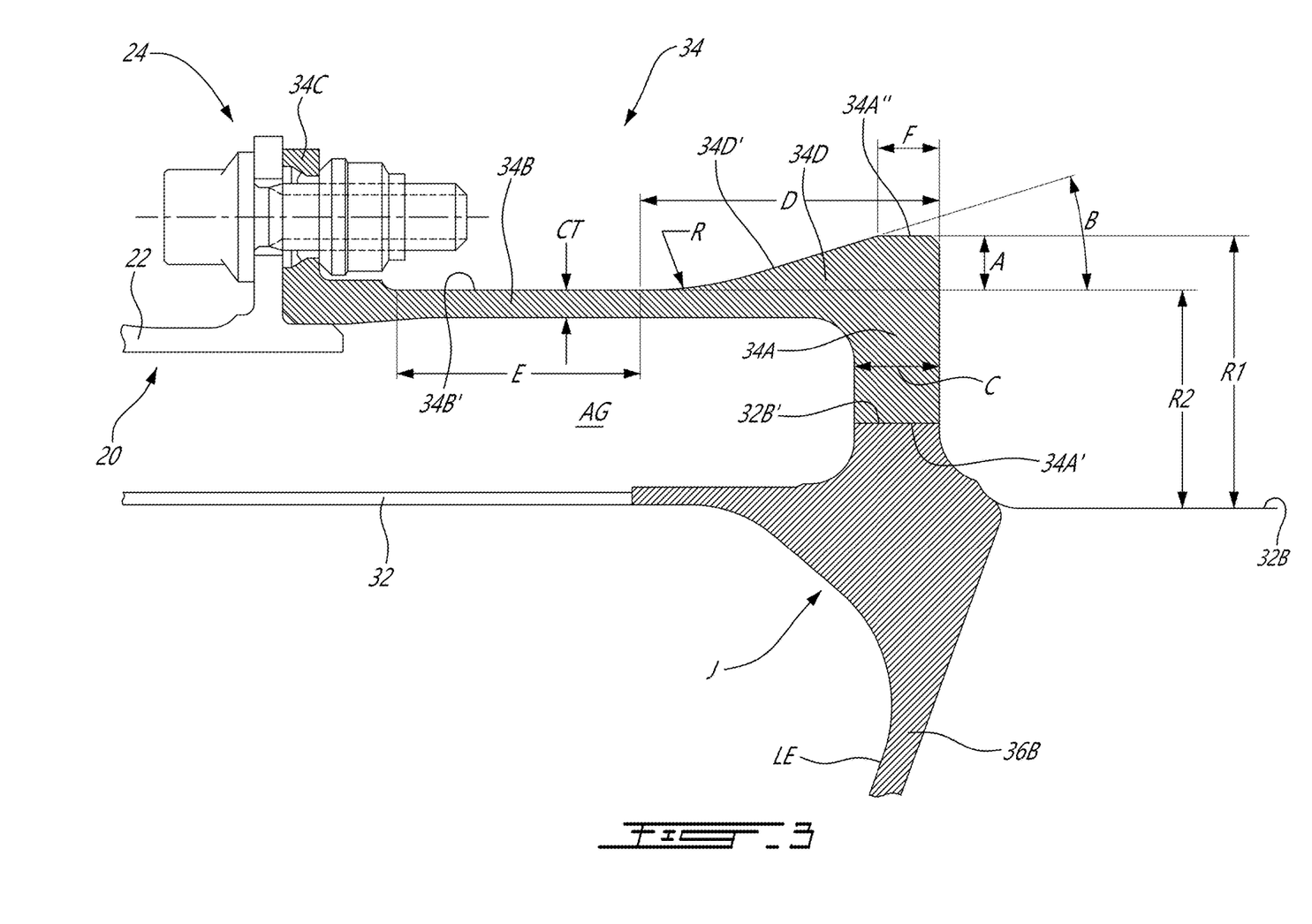
FIG. 3 is an enlarged cross-sectional view of the turbine exhaust case illustrating geometrical details of the turbine exhaust case flange.

The outer structural flange 34 may have additional features that contribute to the functionalities described above. For example, and referring to FIG. 3, it can be appreciated that the ring portion 34A, which is directly above the struts 36, is radially thicker than the tubular portion 34B. As shown in FIG. 3, the ring portion 34A extends radially outwardly to a radially outermost surface 34A", which is spaced by a distance R1 from the outer baseline surface 32B of the outer case 32. The outer surface 34B' of the tubular portion 34B is spaced from the outer baseline surface 32B of the outer case 32 by a distance R2. As shown in FIG. 3, R2 is smaller than R1. In other words, the ring portion 34A projects further radially outwardly from the outer case 32. That is the outer structural flange 34 is radially thicker in the area which is aligned with the thermal growth vector of the struts 36.

Still referring to FIG. 3, it can be appreciated that the outer structural flange 34 is configured so that the radial thickness of the outer structural flange 34 gradually decreases from the ring portion 34A to the tubular portion 34B. This may help to better distribute the tensile stress along the outer structural flange 34 and, thus, avoid stress concentration in the bent region between the ring portion 34A and the tubular portion 34B. As best shown in FIG. 3, the ring portion 34A merges with the tubular portion 34B via a transition portion 34D having a radial thickness that gradually decreases in an axial direction from the ring portion 34A to the tubular portion 34B. According to some embodiments, the transition portion 34D has a sloped outer surface 34D' that slopes from the outermost surface 34A" of the ring portion 34A to the outer surface 34B' of the tubular portion 34B. According to some embodiments, the sloped outer surface 34D' of the transition portion 34D has a slope angle B ranging from 5 to 20 degrees. Still referring to FIG. 3, it can be appreciated that the sloped outer surface 34D' may be initiated axially in the ring portion 34A. That is the axial length F of the radially outermost surface 34A" is shorter than the axial length C of the inner diameter surface 34A' of the ring portion 34A. According to some embodiments, the axial length F is between 0% and 100% of the axial length C and more preferably is at most ⅔ of the axial length C. At 0%, the sloped outer surface starts 34D at the back face of the flange (i.e., the axial length F is zero).

The outer structural flange 34 may have additional features that contribute to the functionalities described above. For example, the tubular portion 34B may have a constant radial wall thickness CT along an axial length E that is equal to or greater than the axial distance D defined by the radially outermost surface 34A" of the ring portion 34A and the sloped outer surface 34D' of the transition portion 34D (i.e., the axial distance between the back face of the ring portion 34A and the beginning of the tubular portion 34B at the end of the narrowing transitional portion 34D).

The outer structural flange 34 may still have additional features that contribute to the functionalities described above. For instance, the axial distance D may be 2 to 3 times greater than the axial length C. A radius or fillet R may also be provided at the junction of the sloped outer surface 34D' and the tubular portion 34B to avoid stress concentration it that region of the flange 34.

The outer structural flange 34 may still have additional features that contribute to the functionalities described above. For example, the sloped outer surface 34D' of the transition portion 34D may have a slope height A that is between 25% and 100% of the axial length C of the inner diameter surface 34A' of the ring portion 34A, preferably between 45% and 55%, and more preferably about 50%.

The configuration of the outer structural flange 34 of the TEC 30, including the various relationships between the geometrical features A, B, C, D, E and F, as disclosed herein helps to reduce bending or deflection in the flange 34 and thus avoid high tensile stress concentration in the material of the TEC 30. This may help to provide a solution to a transient thermal stress issue, which may be more common on gas turbine engines, which are compact relative to the center axis 11. The TEC 30 with its outer flange design as disclosed herein may thus contribute to allowing for the installation of the TEC 30 in an extreme high temperature and compact area of the gas turbine engine 10.

Still according to some embodiments, the TEC 30 is provided with a structural flange 34 that allows radial flexibility to absorb thermal deflection. The flange connection is designed to reduce stress in tension by progressively distributing the stress generated by thermal displacement along the forwardly axially extending tubular portion 34B of the flange 34. The design of the ring portion 34A of the flange 34 from which the tubular portion 34B axially projects is designed to reduce the bending effect at the transition of the flange connection. Notably, the extra material as defined by the geometrical features A, F and B contributes to avoid stress concentration in the flange 34. In addition, such a flange design allows the use of different materials for different portions of the TEC 30, such as Inconel®625 and Waspaloy®. For instance, as mentioned hereinbefore, the inner case 31, the outer case 32 and the struts 36 may be made of Waspaloy® and the outer structural flange 34 may be made of Inconel® 625. Waspaloy® can be exposed to temperatures in excess of 1200° F., but it does not stand up well to tensile stress. So, the flange 34 can be designed with a different material, such as Inconel® 625, which has a better tensile capacity. This combined with one or more of the geometric features A, B, C, D, E and F and any combinations thereof can greatly improve the service life of the TEC 30. Furthermore, at least some of the embodiments allow for a compact turbine exhaust design and reduction in overall engine weight.

Embodiments disclosed herein include:

A. A turbine exhaust case for a gas turbine engine, comprising: an outer case extending around a central axis; an inner case concentrically disposed inside the outer case, the inner case and the outer case defining an annular gas path therebetween; a plurality of circumferentially spaced-apart struts extending across the annular gas path and structurally connecting the inner case to the outer case; and an outer structural flange projecting outwardly from the outer case, the outer structural flange made of a material different from that of the outer case, the outer structural flange including: a ring portion having an inner diameter surface joined to an outer diameter surface of the outer case at a first axial location corresponding to a junction of a leading edge of the plurality of circumferentially spaced-apart struts and the outer case; a tubular portion projecting axially from the ring portion to a second axial location disposed upstream of the plurality of circumferentially spaced-apart struts relative to an exhaust gas flow through the annular gas path; and an annular mounting portion projecting outwardly from an outer surface of the tubular portion at the second axial location.

B. A gas turbine engine comprising: a turbine including a turbine rotor rotatable about a central axis; a turbine support case (TSC) surrounding the turbine rotor; a turbine exhaust case (TEC) mounted to and extending downstream from the TSC relative to a flow of combustion gases through the turbine, the TEC including: an outer case extending around the central axis; an inner case concentrically disposed within the outer case; an annular exhaust gas path radially between the inner case and the outer case for discharging the combustion gases from the turbine; a plurality of struts extending across the annular exhaust gas path from the inner case to the outer case; and an outer structural flange extending radially outwardly from the outer case, the outer structural flange including: a ring portion having an inner diameter surface joined to an outer diameter surface of the outer case at a first axial location aligned with a junction of a leading edge of the plurality of struts and the outer case; a tubular portion projecting axially from the ring portion to a second axial location disposed upstream of the plurality of struts; and an annular mounting portion projecting radially outwardly from the tubular portion at the second axial location, the annular mounting portion secured to a corresponding flange of the TSC.

Embodiments A and B may include any of the following elements, in any combinations:

Element 1: a radial thickness of the outer structural flange gradually decreases axially along a transition from the ring portion to the tubular portion of the outer structural flange. Element 2: the ring portion extends radially outwardly to a radially outermost surface, the radially outermost surface of the ring portion spaced by a distance R1 from an outer surface of the outer case, wherein the outer surface of the tubular portion is spaced from the outer surface of the outer case by a distance R2, and wherein R2 is smaller than R1. Element 3: the radially outermost surface of the ring portion has an axial length F, wherein the inner diameter surface of the ring portion has an axial length C, and wherein the axial length F is at most ⅔ of the axial length C. Element 4: the outer structural flange has a transition portion axially between the ring portion and the tubular portion, the transition portion having a radial thickness which gradually decreases from the ring portion to the tubular portion, and wherein the transition portion has a sloped outer surface that slopes from the radially outermost surface of the ring portion to the outer surface of the tubular portion. Element 5: the sloped outer surface of the transition portion has a slope angle B ranging from 5 to 20 degrees. Element 6: the radially outermost surface of the ring portion and the sloped outer surface of the transition portion extend in series along an axial distance D, wherein the tubular portion has a constant radial wall thickness along an axial length E, and wherein the axial length E is at least equal to the axial distance D. Element 7: the radially outermost surface of the ring portion and the sloped outer surface of the transition portion extend in series along an axial distance D, wherein the inner diameter surface of the ring portion has an axial length C, and wherein the axial distance D is at least 3 times greater than the axial length C. Element 8: the inner diameter surface of the ring portion has an axial length C, and wherein the sloped outer surface of the transition portion has a slope height A that is equal to at least ½ of the axial length C. Element 9: the outer structural flange is made of a material having a greater tensile strength than that of the material forming the outer case. Element 10: the outer case, the inner case and the plurality of circumferentially spaced-apart struts are cast as a one-piece component, the one-piece component made out of Waspaloy®, and wherein the outer structural flange is made out of an Inconel® alloy. Element 11: a weld joint between the outer case and the outer structural flange, the weld joint extending circumferentially around the central axis. Element 12: a strut of the plurality of circumferentially spaced-apart struts has a hollow core circumscribed by a strut wall, wherein an axial thickness of the strut wall at the leading edge of the strut increases at a junction with the outer case. Element 13: a radial thickness of the tubular portion is smaller that a radial thickness of the ring portion, and wherein the tubular portion is spaced radially from the outer case by an annular gap.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while the features of the exhaust case 30 have been described in the context of a turboprop engine, it is understood that similar features are applicable to other types of aircraft engines, including turbofans, turboshafts and auxiliary power units to name a few. Yet further modifications could be implemented by a person of ordinary skill in the art in view of the present disclosure, which modifications would be within the scope of the present technology.

The invention claimed is:

1. A turbine exhaust case for a gas turbine engine, comprising:
    an outer case extending around a central axis;
    an inner case concentrically disposed inside the outer case, the inner case and the outer case defining an annular gas path therebetween;
    a plurality of circumferentially spaced-apart struts extending across the annular gas path and structurally connecting the inner case to the outer case; and
    an outer structural flange projecting outwardly from the outer case, the outer structural flange made of a material different from that of the outer case, the outer structural flange including:
        a ring portion having an inner diameter surface joined to an outer diameter surface of the outer case at a first axial location corresponding to a junction of a leading edge of the plurality of circumferentially spaced-apart struts and the outer case;
        a tubular portion projecting axially from the ring portion to a second axial location disposed upstream of the plurality of circumferentially spaced-apart struts relative to an exhaust gas flow through the annular gas path; and
        an annular mounting portion projecting outwardly from an outer surface of the tubular portion at the second axial location;
    wherein the ring portion extends radially outwardly to a radially outermost surface, the radially outermost surface of the ring portion spaced by a distance R1 from an outer surface of the outer case, wherein the outer surface of the tubular portion is spaced from the outer surface of the outer case by a distance R2, wherein R2 is smaller than R1; and
    wherein the radially outermost surface of the ring portion has an axial length F, wherein the inner diameter surface of the ring portion has an axial length C, and wherein the axial length F is at most ⅔ of the axial length C.

2. The turbine exhaust case of claim 1, wherein a radial thickness of the outer structural flange decreases along an axial direction from the ring portion to the tubular portion of the outer structural flange.

3. The turbine exhaust case of claim 1, wherein the outer structural flange has a transition portion axially between the ring portion and the tubular portion, the transition portion having a radial thickness which gradually decreases from the ring portion to the tubular portion, and wherein the transition portion has a sloped outer surface that slopes from the radially outermost surface of the ring portion to the outer surface of the tubular portion.

4. The turbine exhaust case of claim 3, wherein the sloped outer surface of the transition portion has a slope angle B ranging from 5 to 20 degrees.

5. The turbine exhaust case of claim 3, wherein the radially outermost surface of the ring portion and the sloped outer surface of the transition portion extend in series along an axial distance D, wherein the tubular portion has a constant radial wall thickness along an axial length E, and wherein the axial length E is at least equal to the axial distance D.

6. The turbine exhaust case of claim 3, wherein the radially outermost surface of the ring portion and the sloped outer surface of the transition portion extend in series along an axial distance D, wherein the inner diameter surface of the ring portion has an axial length C, and wherein the axial distance D is at least 3 times greater than the axial length C.

7. The turbine exhaust case of claim 3, wherein the inner diameter surface of the ring portion has an axial length C, and wherein the sloped outer surface of the transition portion has a slope height A that is equal to at least ½ of the axial length C.

8. The turbine exhaust case of claim 1, wherein the outer structural flange is made of a material having a greater tensile strength than that of the material forming the outer case.

9. The turbine exhaust case of claim 1, wherein the outer case, the inner case and the plurality of circumferentially spaced-apart struts are cast as a one-piece component, the one-piece component made out of a first material, and wherein the outer structural flange is made out of a second material, the second material having a greater tensile strength than the first material.

10. The turbine exhaust case of claim 8, further comprising a weld joint between the outer case and the outer structural flange, the weld joint extending circumferentially around the central axis.

11. The turbine exhaust case of claim 10, wherein a strut of the plurality of circumferentially spaced-apart struts has a hollow core circumscribed by a strut wall, wherein an axial thickness of the strut wall at the leading edge of the strut increases at the junction with the outer case.

12. The turbine exhaust case of claim 1, wherein a radial thickness of the tubular portion is smaller that a radial thickness of the ring portion, and wherein the tubular portion is spaced radially from the outer case by an annular gap.

13. A gas turbine engine comprising:
- a turbine including a turbine rotor rotatable about a central axis;
- a turbine support case (TSC) surrounding the turbine rotor;
- a turbine exhaust case (TEC) mounted to and extending downstream from the TSC relative to a flow of combustion gases through the turbine, the TEC including:
  - an outer case extending around the central axis;
  - an inner case concentrically disposed within the outer case;
  - an annular exhaust gas path radially between the inner case and the outer case for discharging the combustion gases from the turbine;
  - a plurality of struts extending across the annular exhaust gas path from the inner case to the outer case; and
  - an outer structural flange extending radially outwardly from the outer case, the outer structural flange including:
    - a ring portion having an inner diameter surface joined to an outer diameter surface of the outer case at a first axial location aligned with a junction of a leading edge of the plurality of struts and the outer case;
    - a tubular portion projecting axially from the ring portion to a second axial location disposed upstream of the plurality of struts; and
    - an annular mounting portion projecting radially outwardly from the tubular portion at the second axial location, the annular mounting portion secured to a corresponding flange of the TSC;
    - wherein the outer structural flange has a transition portion axially between the ring portion and the tubular portion, the transition portion having a radial thickness which gradually decreases from the ring portion to the tubular portion, and wherein the transition portion has a sloped outer surface that slopes from the radially outermost surface of the ring portion to the outer surface of the tubular portion; and
    - wherein the sloped outer surface of the transition portion has a slope angle B ranging from 5 to 20 degrees.

14. The gas turbine engine according to claim 13, wherein the inner case, the outer case and the plurality of struts form a monolithic component made of a first material, and wherein the outer structural flange of the TEC is made from a second material, the second material different from the first material.

15. The gas turbine engine according to claim 14, wherein the ring portion has a greater radial thickness than that of the tubular portion.

16. The gas turbine engine according to claim 13, wherein a radius is provided at a junction of the sloped outer surface and the outer surface of the tubular portion.

17. A turbine exhaust case for a gas turbine engine, comprising:
- an outer case extending around a central axis;
- an inner case concentrically disposed inside the outer case, the inner case and the outer case defining an annular gas path therebetween;
- a plurality of circumferentially spaced-apart struts extending across the annular gas path and structurally connecting the inner case to the outer case; and
- an outer structural flange projecting outwardly from the outer case, the outer structural flange made of a material different from that of the outer case, the outer structural flange including:
  - a ring portion having an inner diameter surface joined to an outer diameter surface of the outer case at a first axial location corresponding to a junction of a leading edge of the plurality of circumferentially spaced-apart struts and the outer case;
  - a tubular portion projecting axially from the ring portion to a second axial location disposed upstream of the plurality of circumferentially spaced-apart struts relative to an exhaust gas flow through the annular gas path; and
  - an annular mounting portion projecting outwardly from an outer surface of the tubular portion at the second axial location;
  - wherein the outer structural flange has a transition portion axially between the ring portion and the tubular portion, the transition portion having a radial thickness which gradually decreases from the ring portion to the tubular portion, and wherein the transition portion has a sloped outer surface that slopes from the radially outermost surface of the ring portion to the outer surface of the tubular portion; and
  - wherein the radially outermost surface of the ring portion and the sloped outer surface of the transition portion extend in series along an axial distance D, the tubular portion having a constant radial wall thickness along an axial length E, and wherein the axial length E is at least equal to the axial distance D.

18. A turbine exhaust case for a gas turbine engine, comprising:
- an outer case extending around a central axis;
- an inner case concentrically disposed inside the outer case, the inner case and the outer case defining an annular gas path therebetween;
- a plurality of circumferentially spaced-apart struts extending across the annular gas path and structurally connecting the inner case to the outer case; and an outer structural flange projecting outwardly from the outer case, the outer structural flange made of a material different from that of the outer case, the outer structural flange including:
  a ring portion having an inner diameter surface joined to an outer diameter surface of the outer case at a first axial location corresponding to a junction of a leading edge of the plurality of circumferentially spaced-apart struts and the outer case;
  a tubular portion projecting axially from the ring portion to a second axial location disposed upstream of the plurality of circumferentially spaced-apart struts relative to an exhaust gas flow through the annular gas path; and
  an annular mounting portion projecting outwardly from an outer surface of the tubular portion at the second axial location;
  wherein the outer structural flange has a transition portion axially between the ring portion and the tubular portion, the transition portion having a radial thickness which gradually decreases from the ring portion to the tubular portion, and wherein the transition portion has a sloped outer surface that slopes from the radially outermost surface of the ring portion to the outer surface of the tubular portion; and
  wherein the radially outermost surface of the ring portion and the sloped outer surface of the transition portion extend in series along an axial distance D, wherein the inner diameter surface of the ring portion has an axial length C, and wherein the axial distance D is at least 3 times greater than the axial length C.

19. A turbine exhaust case for a gas turbine engine, comprising:
an outer case extending around a central axis;
an inner case concentrically disposed inside the outer case, the inner case and the outer case defining an annular gas path therebetween;
a plurality of circumferentially spaced-apart struts extending across the annular gas path and structurally connecting the inner case to the outer case; and
an outer structural flange projecting outwardly from the outer case, the outer structural flange made of a material different from that of the outer case, the outer structural flange including:
  a ring portion having an inner diameter surface joined to an outer diameter surface of the outer case at a first axial location corresponding to a junction of a leading edge of the plurality of circumferentially spaced-apart struts and the outer case;
  a tubular portion projecting axially from the ring portion to a second axial location disposed upstream of the plurality of circumferentially spaced-apart struts relative to an exhaust gas flow through the annular gas path; and
  an annular mounting portion projecting outwardly from an outer surface of the tubular portion at the second axial location;
  wherein the outer structural flange has a transition portion axially between the ring portion and the tubular portion, the transition portion having a radial thickness which gradually decreases from the ring portion to the tubular portion, and wherein the transition portion has a sloped outer surface that slopes from the radially outermost surface of the ring portion to the outer surface of the tubular portion; and
  wherein the inner diameter surface of the ring portion has an axial length C, and wherein the sloped outer surface of the transition portion has a slope height A that is equal to at least ½ of the axial length C.

* * * * *